United States Patent [19]
Hildebrandt

[11] 3,871,100
[45] Mar. 18, 1975

[54] MARKING GAUGE

[75] Inventor: William J. Hildebrandt, West Simsbury, Conn.

[73] Assignee: The Stanley Works, New Britain, Conn.

[22] Filed: June 28, 1973

[21] Appl. No.: 374,644

[52] U.S. Cl. .................................................. 33/42
[51] Int. Cl. ............................................ B43l 13/02
[58] Field of Search ............................ 33/42, 43, 44

[56] References Cited
UNITED STATES PATENTS

| | | | |
|---|---|---|---|
| 141,475 | 8/1873 | Traut | 33/44 |
| 174,879 | 3/1876 | Vetterlein | 33/42 |
| 302,315 | 7/1884 | Bellamy | 33/42 |
| 334,308 | 1/1886 | Traut | 33/42 |
| 1,901,451 | 3/1933 | Jackson | 33/42 |
| 2,579,205 | 12/1951 | Rippon | 33/42 |
| 3,664,025 | 5/1972 | Barto | 33/42 |

Primary Examiner—Richard E. Aegerter
Assistant Examiner—Charles E. Phillips

[57] ABSTRACT

A marking gauge has a body member with an aperture of generally T-shaped configuration extending therethrough to provide a transverse top portion and a stem portion of lesser width defined by a wall providing shoulder faces adjacent the top portion and diverging from the stem portion towards the top portion of the aperture and extending substantially parallel to the longitudinal axis of the aperture over the length thereof. Slidably seated within the aperture is an elongated rule member of generally T-shaped configuration complementary to the aperture of the body member and having a pair of diverging shoulder faces extending in spaced relationship adjacent the top portion thereof and cooperating with the shoulder faces of the body member to provide stable seating. In addition, means are provided for locking the rule member in fixed position within the aperture of the body member. The body member may include a synthetic plastic body portion and a wear plate projecting from the surface thereof, and the locking means desirably comprises a thumb screw.

9 Claims, 5 Drawing Figures

PATENTED MAR 18 1975

MARKING GAUGE

BACKGROUND OF THE INVENTION

Marking gauges are widely employed for scribing a line at a fixed distance inwardly from the edge of a workpiece so as to provide a guide for other operations. This technique is particularly beneficially employed in the marking of wood and other workpieces for sawing or related operations since the marking gauge may be rapidly moved along the length of the workpiece. Various materials have been used in the construction of marking gauges, including wood and metal, but synthetic plastic resin has generally been considered to be inappropriate for this application because of the necessity for wear resistant properties and highly accurate registry. Moreover, many marking gauges have been grossly deficient in insuring the desired registry of the scratch pin or other marking element because of the tendency for the parts to wear and because of the tendency for dirt and other contamination to penetrate between the mating surfaces thereof.

It is a object of the present invention to provide a marking gauge of relatively simple and long lived construction and which affords highly stable and accurate seating of the rule member within the body member.

It is also an object to provide such a marking gauge in which friction between the rule member and the body member in which it slides is minimized during relative sliding movement thereof and in which accurate positioning is attained by reason of the engagement of relatively small cooperating surface portions thereof.

Another object is to provide such a marking gauge in which a rule member may be firmly locked in position without excessive wear of the rule member.

Still another object is to provide a marking gauge in which synthetic plastic resins may be utilized for the bulk of the components thereof and which affords a highly wear resistant and durable structure.

SUMMARY OF THE INVENTION

It has now been found that the foregoing and related objects can be readily attained in a marking gauge which includes a body member having an aperture extending therethrough of generally T-shaped configuration providing a transverse top portion and a stem portion of lesser width with the wall defining said aperture including a pair of diverging faces adjacent the top portion. These shoulder faces diverge from the stem portion of the aperture towards the top portion thereof and extend in opposed spaced relationship on opposite sides and parallel to the longitudinal axis of the aperture. Slidably seated within the aperture of the body member is an elongated rule member of generally T-shaped configuration complementary to the aperture of the body member with a top portion and a stem portion of lesser width. A pair of diverging shoulder faces on the rule member diverge from the stem portion towards the top portion thereof and extend in parallel relationship to the shoulder faces of the body member along at least a substantial portion of the length of the rule member. The shoulder faces of the rule member cooperate with the shoulder faces of the body member to stably seat the rule thereon and to permit sliding of the rule along its length thereupon. The rule member is cooperatively dimensioned and configured with respect to the aperture of the body member so as to provide spacing therebetween except along the cooperating shoulder faces. Means on the body member engages the upper surface of the top portion of the rule member and locks the rule member in fixed position within the aperture of the body member with the shoulder faces in firm surface contact.

The rule member has the measuring indicia spaced along the side surfaces of the stem portion thereof and it is conveniently provided with a stop portion adjacent one end thereof which projects therefrom so as to bear against a surface of the body member outwardly from the aperture when that end is moved thereagainst in a fully extended position.

The body member is conveniently fabricated with a body portion of synthetic plastic resin and a wear plate projecting from one surface of the body portion so as to provide a wear surface for placement against the surface of a workpiece.

The locking means conveniently comprises a thumb screw threadably mounted in the body member and applying pressure to the rule member to effect locking thereof within the aperture of the body member. A shoe is most desirably provided within the aperture of the body member and the thumb screw bears thereupon and it in turn bears upon the rule member.

The marking gauge also includes a scribe pin seated in the rule member adjacent and end thereof and projecting from the lower surface thereof so as to scribe a workpiece over which the marking gauge is traversed. Conveniently, the body portion of the body member, the rule member and the locking means are all fabricated from synthetic plastic resin to provide a rugged and light weight assembly.

DETAILED DESCRIPTION OF THE ILLUSTRATED EMBODIMENT

Figure 1:
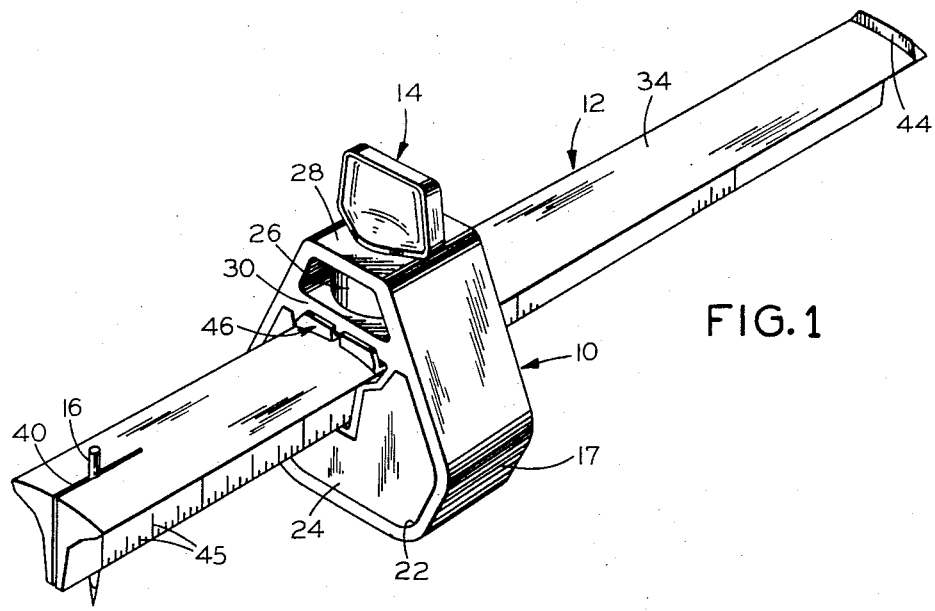
FIG. 1 is a perspective view of a marking gauge embodying the invention.
Figure 2:
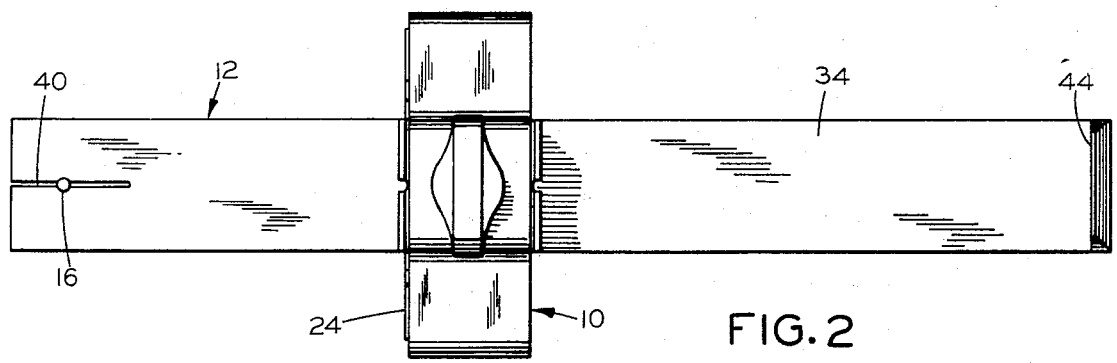
FIG. 2 is a plan view thereof.

Turning first to FIG. 1 of the attached drawings, therein is illustrated a marking gauge embodying the present invention and comprised of the body member generally designated by the numeral 10 in which is slidably seated the elongated rule member generally designated by the numeral 12. The thumb screw generally designated by the numeral 14 may be utilized to lock the rule member in any position of extension relative to the body member 10 and the scratch pin 16 is utilized to scribe the desired mark or line along the surface of the workpiece as the marking gauge is moved therealong.

Figure 4:
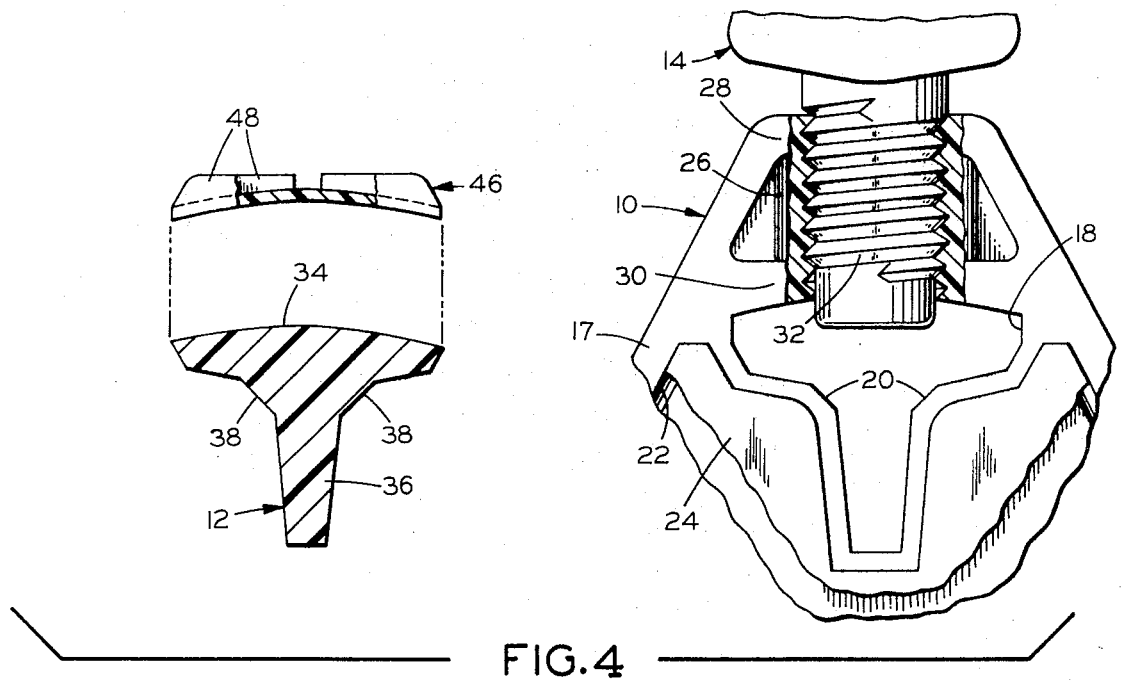
FIG. 4 is a fragmentary partially exploded view to an enlarged scale of the marking gauge with a portion of the body member shown in section so as to clarify the threaded engagement of the thumb screw therein.
Figure 5:
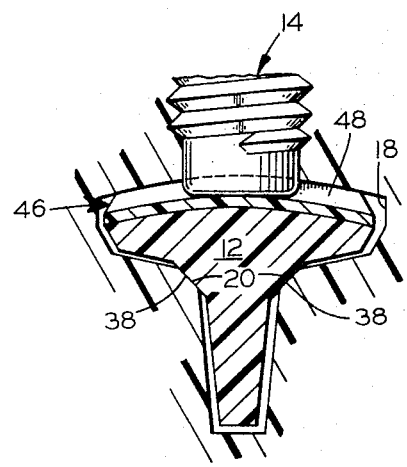
FIG. 5 is a fragmentary cross sectional view showing the clamping action and alignment of the rule member by reason of the cooperating shoulder faces.

Turning now in greater detail to the structure of the body member 10 as is best seen in FIGS. 1, 4 and 5, it includes a body portion 17 of synthetic plastic resin having an aperture 18 of generally T-shaped configuration which extends throughout the thickness thereof and provides a transverse top portion and a stem portion of lesser width. The wall defining the aperture 18 includes a pair of diverging shoulder faces 20 which extend substantially parallel along the length of the aperture and provide a transitional portion between the relatively large width of the top of the T-shaped configuration and the stem portion thereof. Spaced below the aperture 18, the body portion 17 has a recess 22 formed in one face thereof in which is seated a brass wear insert 24 which is of slightly greater thickness than the depth of the recess so as to project beyond the face of the body portion 17, thus providing a wear surface for the marking gauge as it is moved along an edge of the workpiece. The upper portion of the body member is molded with a tubular barrel 26 extending between the transverse wall portions 28, 30 thereof, and this barrel 26 and the transverse wall portions 28, 30 are internally threaded for threaded engagement with the shank 32 of the thumb screw 14.

The rule member 12 is of generally T-shaped cross sectional configuration with a cap or top portion 34 of generally convex configuration and a stem portion 36 which tapers to a reduced width at the base thereof. Extending between the lower surface of the cap portion 34 and the side surfaces of the stem portion 36 are diverging shoulder faces 38 which extend in spaced relationship over substantially the entire length of the rule member. As can be seen in FIG. 5, the shoulder faces 38 have essentially the same angular disposition as the shoulder faces 20 of the body portion 17 so that the rule member will seat accurately and firmly thereon. As also seen in FIG. 5, the rule member 12 has a cross sectional configuration and dimensioning providing a spacing from the wall defining the aperture 18 except at the shoulder faces 20 which provide the desired accurate seating thereof. In this manner not only is stable, accurate seating provided but also minimization of frictional contact and wear is afforded.

Figure 3:
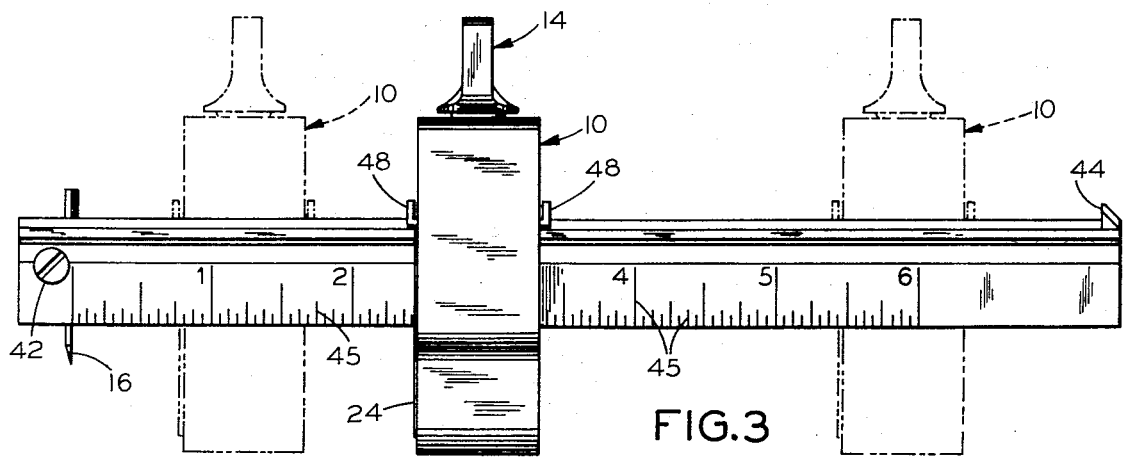
FIG. 3 is a side elevational view thereof with the body member shown in phantom line in two positions of relative movement of the rule member.

As seen in FIGS. 1 and 3, the side surfaces of the stem portion 36 are provided with measuring indicia 45 (shown in inches in the illustrated embodiments) with the base reference or zero mark coinciding with the location of the scratch pin 16. As a result, the rule member 12 may be adjusted relative to the body member 10 so as to orient the scratch pin a predetermined distance outwardly therefrom visually obserable by the registration of the measuring indicia with the face of the wear insert 24, as best seen in FIG. 3. The diverging beveled surfaces at the sides of the cap portion 34 allow the marking gauge to be pivoted onto its side so as to permit the surface of the rule member 12 to provide a cooperating guide surface.

Adjacent one end, the rule member 12 is provided with a slot 40 in whihch is seated the scratch pin 16 and the scratch pin may be locked in an adjusted postion by the clamp screw and nut 42 which bridge the slot 40 in the rule member 12. Adjacent its opposite end, the rule member 12 is provided with an upwardly extending stop boss 44 which will bear upon the body member 10 to limit further movement into the aperture 18.

To minimize wear the rule member 12 and to distribute the clamping pressure over substantially the full surfaces of the shoulder faces 20, 38, a shoe generally designated by the numeral 46 is interposed between the thumb screw 14 and rule member 12 within the aperture 18. As best seen in FIGS. 4 and 5, the shoe 46 has an arcuate configuration conforming closely to the convex configuration of the cap portion 34 of the rule member. The upstanding lips 48 serve to prevent inadvertent disengagement of the shoe 46 from within the aperture 18.

In utilizing the marking gauge of the present invention, the thumb screw 14 is backed off from the shoe 46 to permit sliding movement of the rule member 12 within the aperture 18 of the body member 10. The rule member may then be slid along the shoulder faces 20 to align the desired measuring indicium 45 with the face of the wear insert 24 as seen in FIG. 3. The thumb screw 14 is then tightened to lock the rule member 12 in this position, and the marking gauge is then placed against the side edge of the workpiece. As the marking gauge is drawn along the edge of the workpiece, the scratch pin 16 will scribe a line the predetermined distance inwardly from that edge, and the wear insert 24 will provide a relatively wear resistant surface minimizing the likelihood of injury to the synthetic plastic resin providing the body portion 17 of the body member 10.

It will be appreciated that the length of projection of scratch pin 16 below the stem portion 36 of the rule member 12 may be varied by releasing the clamping pressure provided by the clamp screw 42. In similar manner, the scratch pin 16 may be removed for sharpening or replacement.

It will be appreciated that the marking gauge of the present invention enables the utilization of synthetic plastic resin for the bulk of the components thereof, although metal or ceramics may be utilized if so desired. In the illustrated embodiment, the only metallic members are the scratch pin and the wear insert which is preferably of brass to minimize friction and provide the desired degree of wear resistance.

The several plastic members are desirably formed by injection molding so as to facilitate the formation of the complex sections and to minimize the amount of resin required as for example in the fabrication of body portion in the body member. Among the synthetic resins which may be employed are ABS polymers, polyacetals, polyamides, polypropylene and polycarbonate. Of the various resins, ABS polymers are preferred for the body portion and rule member and polyacetal resin is preferred for the thumb screw and shoe.

It will be readily apparent that other configurations may be employed for the several components, it being essential only that there be provided the diverging shoulder faces along the wall providing the aperture through the body member and along the sides of the rule member. In this manner, the desired stable, accurate seating of the rule member within the aperture can be obtained while at the same time insuring minimization of frictional contact and wear. It will also be apparent that the brass wear insert may be omitted or there may be substituted therefor wear members of other materials and configurations including ceramics and other synthetic plastics. The wear insert may be retained within the recess of the body portion by adhesive engagement, snap fit or other suitable means. If so desired, the wear insert can be a replaceable member.

Thus, it can be seen that the marking gauge of the present invention provides a relatively light weight, economical and wear resistant structure which affords a high degree of reliable and stable seating of the rule member in various extended positions thereof relative to the body member. The rule member may be moved easily within the body member, accurately positioned and securely locked in place to insure reliable marking of the workpiece.

I claim:

1. A marking gauge comprising:
    A. a body member having an aperture extending therethrough of generally T-shaped configuration providing a transverse top portion and a stem portion of lesser width with the wall defining said aperture including a pair of shoulder faces adjacent said top portion and diverging from said stem portion of said aperture towards said top portion, said should faces extending in opposed spaced relationship on opposite sides of and parallel to the longitudinal axis of said aperture;
    B. an elongated rule member of generally T-shaped configuration complementary to said aperture of said body member and slidably seated in said aperture, said rule member having a top portion and a stem portion of lesser width with a pair of shoulder faces diverging from said stem portion towards said top portion and extending in parallel relationship to the shoulder faces of said body member along at least a substantial portion of the length of said rule member, the shoulder faces of said rule member cooperating with the shoulder faces of said body member for stable seating of said rule member thereon and for sliding of said rule member along its length thereupon, said rule member being cooperatively dimensioned and configured with respect to said body member aperture to provide spacing therebetween except along said cooperating shoulder faces, wherein a portion of the rule member which normally may be engaged with a work surface and collect foreign matter is not used in said seating function; and
    C. means on said body member engaging the upper surface of said top portion of said rule member for locking said rule member in fixed position within said aperture of said body member with said shoulder faces in firm surface contact.

2. The marking gauge in accordance with claim 1 wherein said aperture has said T-shaped configuration over substantially the entire thickness of said body member and wherein said rule member has said T-shaped configuration over substantially its entire length.

3. The marking gauge in accordance with claim 2 wherein said rule member has a stop portion adjacent one end thereof and projecting therefrom so as to bear against a surface of said body member outwardly from said aperture when said one end is moved thereagainst in a fully extended position.

4. The marking gauge in accordance with claim 1 wherein said rule member has measuring indicia spaced along the side surfaces of said stem portion thereof.

5. The marking gauge in accordance with claim 1 wherein said body member has a body portion fabricated from synthetic plastic resin and includes a wear plate projecting outwardly from one surface of said body portion below said rule member so as to provide a wear surface for placement against the surface of a workpiece.

6. The marking gauge in accordance with claim 1 wherein said locking means comprises a thumb screw threadably mounted in said body member and applying pressure said top portion of to said rule member to effect locking thereof within said appertu re of said body member.

7. The marking gauge in accordance with claim 6 wherein there is included in said aperture of said body member a shoe upon which said thumb screw bears and which in turn bears upon said rule member.

8. The marking gauge in accordance with claim 1 wherein said marking gauge includes a scribe pin seated in said rule member adjacent one end therof and projecting therefrom so as to scribe a workpeice over which said marking gauge is traversed.

9. The marking gauge in accordance with claim 1 wherein said body member includes a body portion fabricated from synthetic plastic resin and providing said shoulder faces and wherein said rule member and locking means are fabricated from synthetic plastic resin.

* * * * *